(12) United States Patent
Bugenhagen

(10) Patent No.: US 7,599,399 B1
(45) Date of Patent: Oct. 6, 2009

(54) JITTER BUFFER MANAGEMENT

(75) Inventor: Michael K. Bugenhagen, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 637 days.

(21) Appl. No.: 11/115,490

(22) Filed: Apr. 27, 2005

(51) Int. Cl.
*H04J 3/06* (2006.01)

(52) U.S. Cl. .......................... 370/516; 370/426

(58) Field of Classification Search ............... 370/229, 370/230, 231, 232, 235, 235.1, 252, 412, 370/373, 377, 384, 389, 426
See application file for complete search history.

(56) References Cited

U.S. PATENT DOCUMENTS

| | | | |
|---|---|---|---|
| 6,418,125 B1 | 7/2002 | Oran | |
| 6,452,950 B1 | 9/2002 | Ohlsson et al. | |
| 6,504,838 B1 | 1/2003 | Kwan | |
| 6,658,027 B1 * | 12/2003 | Kramer et al. | 370/516 |
| 6,665,317 B1 * | 12/2003 | Scott | 370/516 |
| 6,684,273 B2 | 1/2004 | Boulandet et al. | |
| 6,744,768 B2 * | 6/2004 | Vikberg et al. | 370/395.21 |
| 6,747,999 B1 | 6/2004 | Grosberg et al. | |
| 6,765,931 B1 | 7/2004 | Rabenko et al. | |
| 6,788,651 B1 | 9/2004 | Brent et al. | |
| 6,829,244 B1 * | 12/2004 | Wildfeuer et al. | 370/412 |
| 6,862,298 B1 | 3/2005 | Smith et al. | |
| 7,246,057 B1 * | 7/2007 | Sundqvist et al. | 704/219 |
| 7,370,126 B2 * | 5/2008 | FitzGerald | 710/52 |
| 7,426,221 B1 * | 9/2008 | Cutaia | 370/516 |
| 2005/0058146 A1 * | 3/2005 | Liu et al. | 370/412 |

OTHER PUBLICATIONS

Introduction to Circuit Emulation Services over Ethernet The Metro Ethernet Forum 2004.; http://www.metroethernetforum.org. pp. 1-6.
Peter Meyer, "Circuit Emulation Services-over-Packet and Cellular Backhaul," as published in analog Zone; Zarlink Semiconductor Packet Processing, pp. 1-6.

* cited by examiner

Primary Examiner—Brenda Pham

(57) ABSTRACT

In an embodiment of the invention, a communication device comprises a jitter buffer configured to buffer communications, a processing system configured to determine a utilization metric based on a percentage used of the jitter buffer and process the utilization metric to determine a usage state of the jitter buffer, and an interface configured to transmit a state message indicating the usage state of the jitter buffer.

15 Claims, 7 Drawing Sheets

JITTER BUFFER MANAGEMENT

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to systems, methods, and software for jitter buffer management in telecommunication networks.

2. Description of the Prior Art

It is commonly known that jitter buffers are located at the mid points and end points of most packet communication paths used for real-time applications. Jitter buffers can be implemented at network mid points, such as in routers, border controllers, or media gateways. Jitter buffers are also implemented at the end points, such as on customer premise equipment and user devices. Jitter buffers are used to reduce the effects of variable latency or delay in packet communication paths. Examples of jitter buffers include differential delay buffers and coding/decoding (codec) jitter buffers used to smooth packet synchronization or ordering for playout. Given the live nature of real-time applications, jitter buffer operations have a large effect on the quality of real-time applications. For example, an end user could experience either a gap in the operation of or a complete cessation of a real-time application as a result of packet jitter.

Unfortunately, network carriers are not capable of monitoring the performance of static or dynamic jitter buffers because jitter buffers are often times physically located within the boundaries of other third-party networks. Thus, any particular carrier remains unaware of the underlying status of the jitter buffers. As a consequence, the operation of a third party network could degrade without providing other carriers with any prior warning.

SUMMARY OF THE INVENTION

An embodiment of the invention helps solve the above problems and other problems by providing systems, methods, and software products that allow a carrier to monitor the status of jitter buffers in its network and third party networks, thereby providing improved network management capabilities. In an embodiment of the invention, a communication device comprises a jitter buffer configured to buffer communications, a processing system configured to determine a utilization metric based on a percentage used of the jitter buffer and process the utilization metric to determine a usage state of the jitter buffer, and an interface configured to transmit a state message indicating the usage state of the jitter buffer.

In an embodiment of the invention, the jitter buffer resides within an access provider network.

In an embodiment of the invention, the interface is further configured to transmit the state message to a call processing system that resides in a service provider network.

In an embodiment of the invention, the jitter buffer comprises a static jitter buffer.

In an embodiment of the invention, the jitter buffer comprises an adaptive jitter buffer.

In an embodiment of the invention, the processing system is configured to process the utilization metric to determine if the percentage used of the jitter buffer is high, medium, or low.

In an embodiment of the invention, a method of operating a communication device having a jitter buffer comprises buffering communications in the jitter buffer, determining a utilization metric based on a percentage used of the jitter buffer, processing the utilization metric to determine a usage state of the jitter buffer, and transmitting a state message indicating the usage state of the jitter buffer.

In an embodiment of the invention, the communication device resides within an access provider network.

An embodiment of the invention includes transmitting the state message to a call processing system that resides in a service provider network.

In an embodiment of the invention, the jitter buffer comprises a static jitter buffer.

In an embodiment of the invention, the jitter buffer comprises an adaptive jitter buffer.

An embodiment of the invention includes processing the utilization metric to determine the usage state comprises processing the utilization metric to determine if the percentage used of the jitter buffer is high, medium, or low.

BRIEF DESCRIPTION OF THE DRAWINGS

The same reference number represents the same element on all drawings.

DETAILED DESCRIPTION OF THE PREFERRED EMBODIMENT

FIGS. 1-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
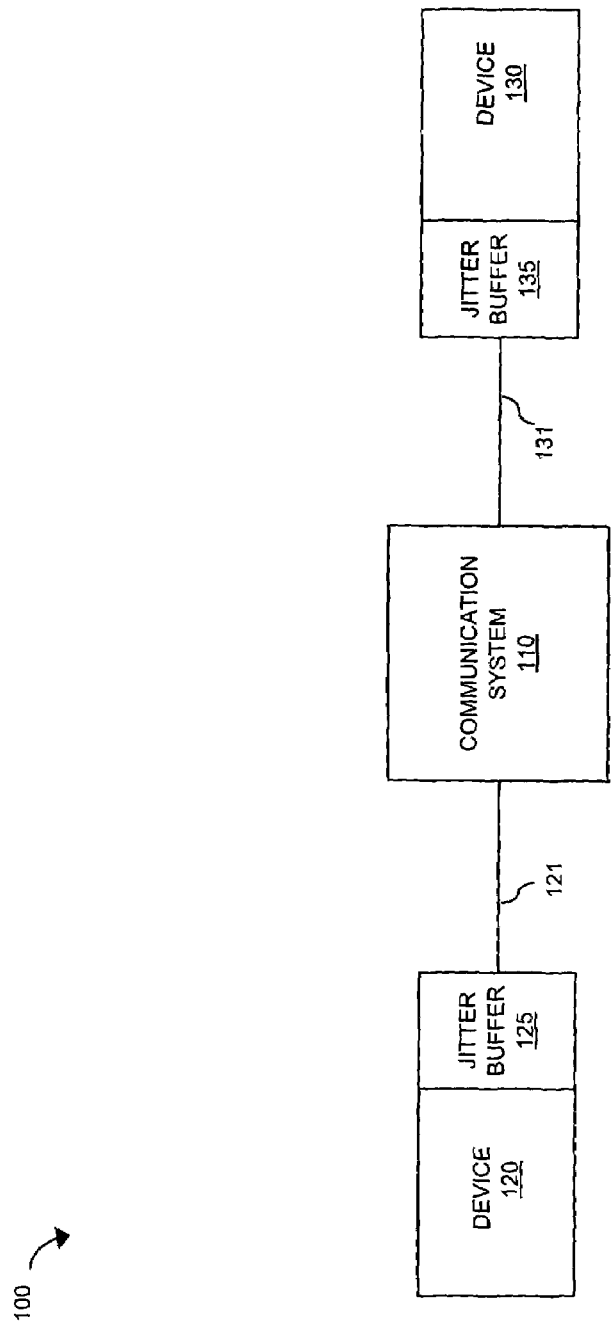
FIG. 1 illustrates a communication network in an embodiment of the invention.
Figure 2:
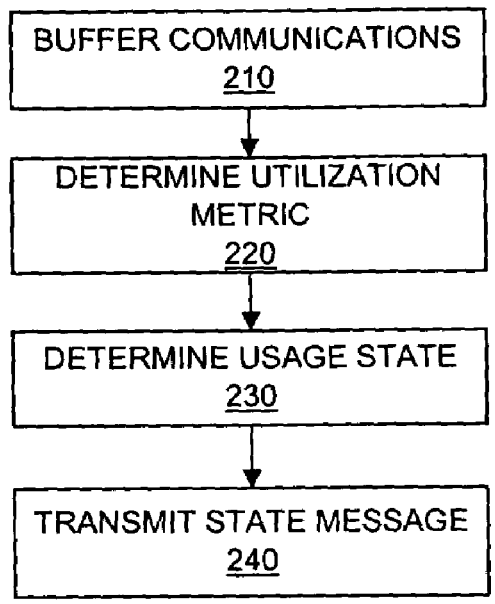
FIG. 2 illustrates the operation of a communication network in an embodiment of the invention.

FIGS. 1 and 2

FIG. 1 illustrates communication network 100 in an embodiment of the invention. Communication network 100 includes communication system 110, device 120, and device 130. Device 120 is in communication with communication system 110 over path 121. Device 130 is in communication with communication system 110 over path 131. Device 120 includes jitter buffer 125. Device 130 includes jitter buffer 135.

Traffic is carried over path 121 to and from device 120. Similarly, traffic is carried over path 131 to and from device 130. Device 120 could be a network element, such as an end user device, customer premise equipment, routing system, or gateway, as well as other types of network elements. Device 130 could also be a network element, such as an end user device, customer premise equipment, routing system, or gateway, as well as other types of network elements. Communication system 110 could be an intermediate system, such as a routing system or a communication network, as well as other types of intermediate systems.

FIG. 2 illustrates the operation of communication network 100 in an embodiment of the invention. In operation, traffic is sent over path 121 to device 120. The traffic could be packet traffic that requires buffering. For example, real-time applications like video and voice over packet often times require buffering to reduce jitter. Jitter buffer 125 therefore buffers the traffic as it arrives at device 120 (Step 210). Next, a utilization metric is determined (Step 220). The utilization metric could represent, for example, a percentage used of the jitter buffer during any given sampling period. A usage state is then determined based on the utilization metric (Step 230). The usage state could indicate, for example, whether the jitter buffer is in a state of low use, medium use, or high use. The usage state could be determined relative to historical usage patterns for the jitter buffer. Lastly, a state message is transmitted indicating the usage state of the jitter buffer (Step 240).

Advantageously, communication network 100 allows a carrier to monitor the status of jitter buffers in its network and third party networks, thereby providing improved network management capabilities. In addition, communication network 100 provides a pro-active way to monitor the status of various network paths, as opposed to reacting to network failures. Such a system is beneficial for supporting real-time packet applications, such as video and voice over packet. Additionally, such a system is beneficial to packet based circuit emulation applications, as well as to pure packet based applications.

In an alternative embodiment of the invention, device 120 could be in communication with device 130 over paths 121 and 131, and through communication system 110. In this embodiment, jitter buffer 125 could enter a state of congestion. In such as case, the utilization threshold metric would be determined and a usage state derived from the utilization metric. The usage state would indicate that jitter buffer 125 had entered a period of congestion. In response, device 120 would transmit a state message indicating the usage state.

Communication system 110 could receive the usage state message and process the message to determine the current path associated with device 120. In this case, the current path associated with device 120 is path 121. In addition, communication system 110 could process the message to determine any other end points associated with device 120. In this case, device 130 is an end point associated with device 120.

In response to the congestion experienced by jitter buffer 121, several actions could be taken. For example, jitter buffer 125, if it is an adaptive jitter buffer, could increase its size to accommodate the additional traffic. In another example, communication system 110 could slow down the rate at which traffic is transmitted to device 120. However, in this case, communication system 110 would then transmit a control message to device 130 to slow down the rate of its transmissions to device 120. This could be accomplished in several ways, such as by increasing the size of jitter buffer 135. This solution would require that jitter buffer 135 is a bi-directional jitter buffer that is capable of buffering incoming and outgoing traffic for device 130. Thus, jitter buffer 135 would increase the size of the buffer with respect to outgoing traffic, thereby slowing down traffic sent to device 120 to aid in lessening the congestion in jitter buffer 125.

In another alternative, jitter buffers 125 and 135 could be static or dynamic. Static jitter buffers could pre-configured with a particular size that does not change during operation. When a static jitter buffer becomes congested, packets are simply dropped. Dynamic, or adaptive, jitter buffers could be automatically reconfigured to accommodate higher traffic patterns.

Second Embodiment Configuration and Operation

FIGS. 3-6

Figure 3:
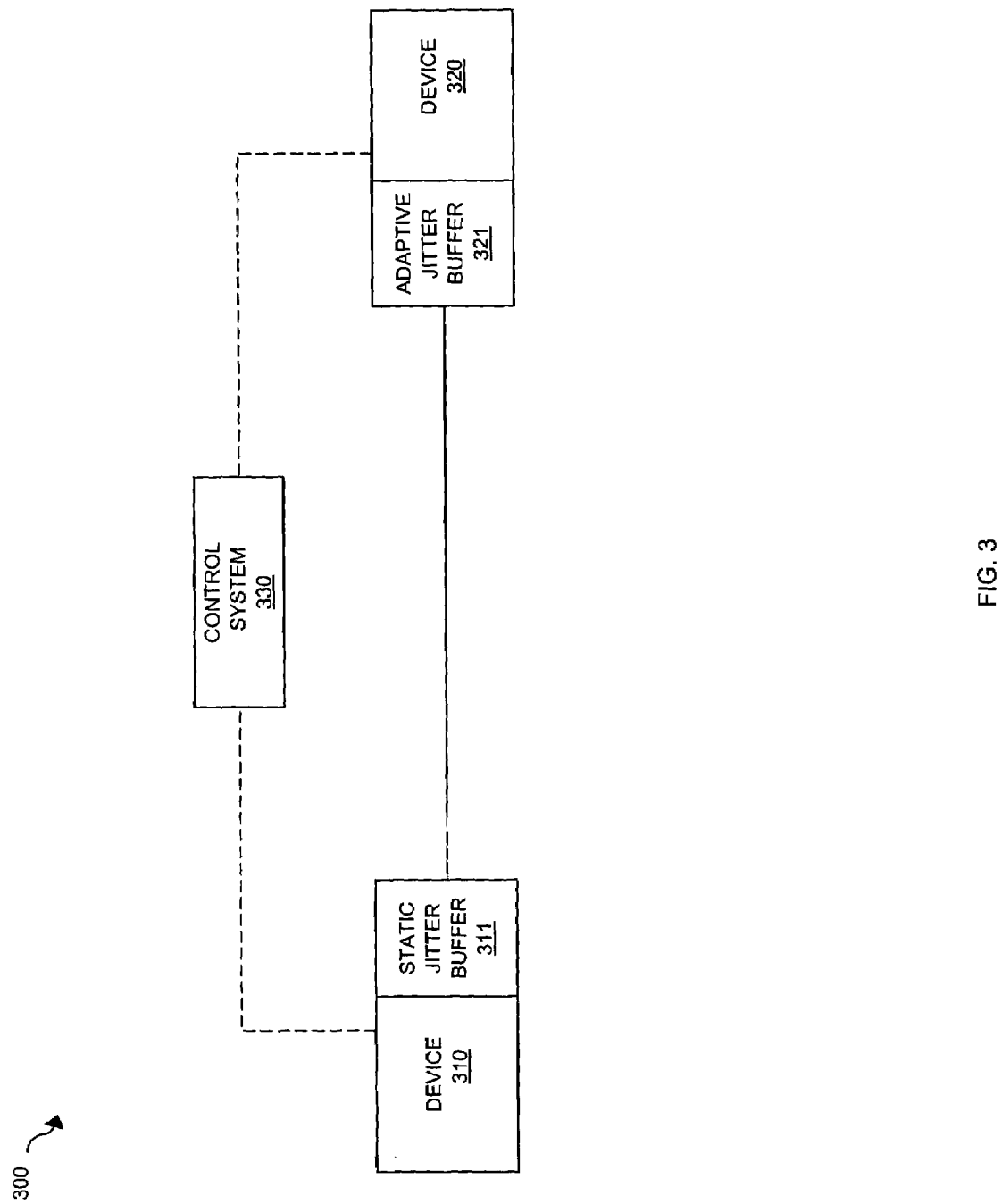
FIG. 3 illustrates a communication system in an embodiment of the invention.

FIG. 3 illustrates communication system 300 in an embodiment of the invention. Communication system 300 includes device 310, device 320, and control system 330. Device 310 includes jitter buffer 311. Device 320 includes jitter buffer 321. Device 310 is in communication with device 320. Similarly, device 310 is in communication with control system 330. Device 320 is also in communication with control system 330. An intermediate system, such as a routing system, is not pictured for the sake of clarity. Device 310 and device 320 exchange communications for a service. For example, device 310 and device 320 exchange packet communications for packet services, such as voice or video over packet. Communications sent by device 320 to device 310 are buffered by static jitter buffer 311. Communications sent by device 310 to device 320 are buffered by adaptive jitter buffer 321.

Figure 4:
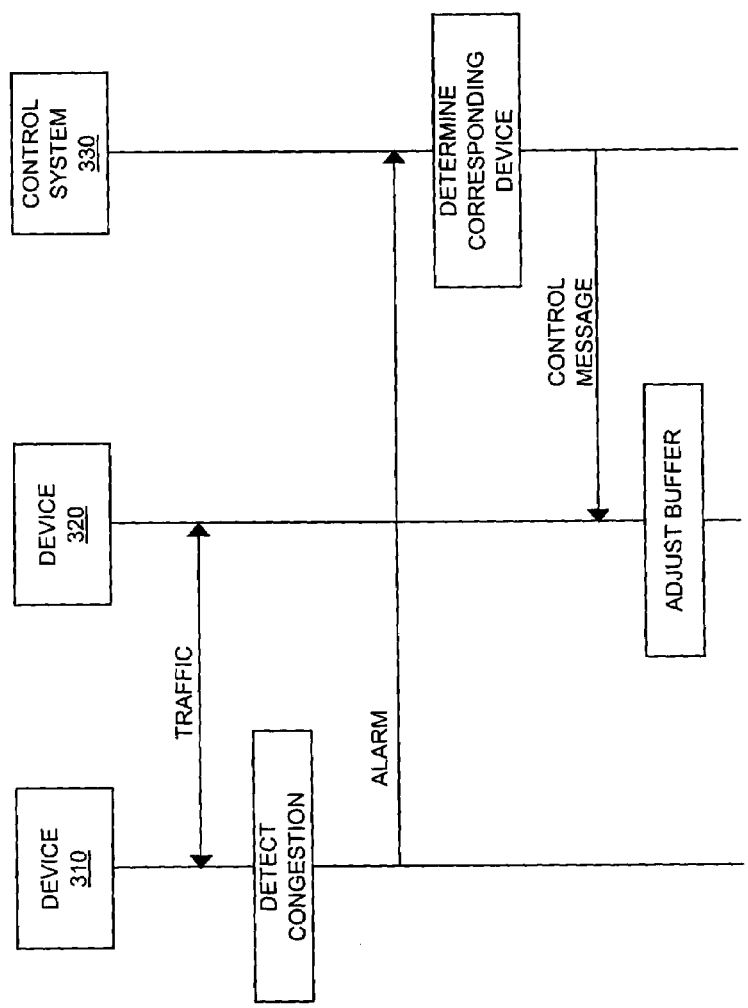
FIG. 4 illustrates the operation of a communication system in an embodiment of the invention.

FIG. 4 illustrates the operation of communication system 300 in an embodiment of the invention. In operation, device 320 transfers traffic to device 310. During operation, jitter buffer 311 becomes congested. In response to the congestion device 310 transmits an alarm message to control system 330. The alarm message indicates both the device in congestion— device 310—and the particular service currently running on device 310. For instance, the service could be a VoP session.

Control system 330 receives and processes the alarm message to determine a corresponding device participating on the service. In this case, control system 330 determines that device 320 is participating on the service. Control system 330 then responsively transmits a control message to device 320 instructing device 320 to adjust its jitter buffer 321 to reduce the rate at which traffic is transmitted to device 310. Device 320 receives the control message and responsively adjusts jitter buffer 321. For example, device 320 could adjust jitter buffer 321 by increasing the size of the buffer.

An increase in the size of the buffer would increase the delay of traffic at device 310. Upstream traffic sent from device 310 to device 320 would therefore be delayed at device 320. If device 320 is an end user device, the increased delay would result in the end user experiencing a time period of delay. In the case of voice traffic, the end user would also therefore implicitly delay his own response. The implicit delay would carry over to downstream traffic sent by device 320 to device 310. Device 310 would therefore be provided a resulting traffic delay caused by the increase in size of jitter buffer 321. The resulting traffic delay would then allow jitter buffer 310 to reduce or even eliminate its congestion. Communication system 300 therefore advantageously provides for reducing the congestion in static jitter buffers by adjusting the size of adaptive or dynamic jitter buffers.

In an alternative, jitter buffer 321 buffers incoming traffic to device 320. Device 320 could also include an outgoing buffer. Responsive to the control message transferred from control system 330, device 320 could adjust the size of the outgoing buffer to introduce delay to downstream traffic sent to device 310. In this manner, incoming traffic can be processed at a normal rate, and outgoing traffic can be delayed. The delay introduced to the outgoing traffic will provide device 310 with an opportunity to clear jitter buffer 311.

Figure 5:
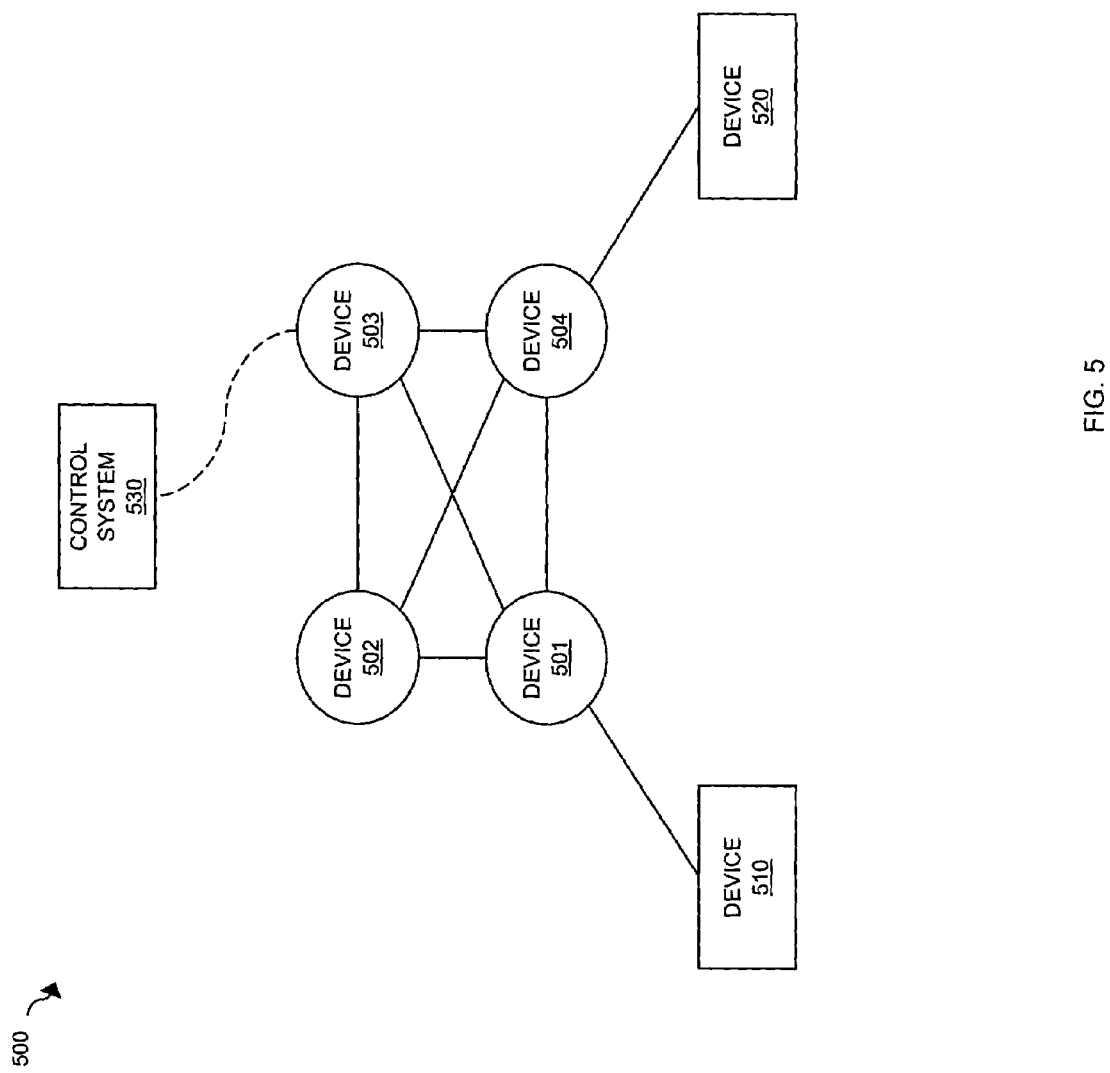
FIG. 5 illustrates a communication network in an embodiment of the invention.

FIG. 5 illustrates communication network 500 in an embodiment of the invention. Communication network 500 includes device 510, end user device 520, and control system 530. Communication network 500 also includes intermediate devices 501, 502, 503, and 504. Several paths interconnect device 510 with device 520. A first path is from device 501 to device 504. A second path is from device 501 to device 503, and in turn, to device 504. A third path is from device 501 to device 502, across to device 503, and in turn, to device 504. A fourth path is from device 501 to device 502, and in turn, to device 504. Lastly, a fifth path is from device 501 to device 503, across to device 502, and then to device 504. Other paths are possible if traffic is allowed to traverse any of the devices more than one. However, for illustrative purposes, the paths discussed only involve paths that cross any particular device just once.

In operation, traffic is exchanged between devices 510 and 520 in accordance with a packet communication protocol, such as IP (Internet Protocol). Successive packets could possibly travel along any of the given paths, irrespective of the path traveled by the previous or next packet using protocols such as MPLS, as well as other protocols. During operation, intermediate devices 501, 502, 503, and 504 are in communication with control system. Similarly, devices 510 and 520 could also be in communication with control system 530. Devices 501, 502, 503, and 504 include jitter buffers.

At any given time, one of devices 501, 502, 503, or 504 could experience a status change, such as congestion. For this embodiment, it is assumed for illustrative purposes that device 503 becomes congested. A jitter buffer in device 503 could become congested due to any number of reasons, such as physical hardware failure, or a spike in traffic directed towards device 503. In response to the congested jitter buffer, device 503 transfers an alarm message to control system 530, as illustrated by the dashed line.

Control system 530 receives and processes the alarm message to determine any real-time applications currently running within its purview that are utilizing paths that traverse device 503. While device 503 likely transports any number of types of traffic, such as non-time sensitive data like e-mail, control system 530 would likely not retain control over all the traffic routed through device 530. However, control system 530 could retain control over traffic generated by the real-time applications running within its purview. For example, a voice over packet conversation conducted between device 510 and 520 would have been setup and controlled by control system 530.

As discussed above, multiple paths through device 501, 502, 503, and 504 could be used for the real-time application data. Control system 530 could therefore take a number of actions in response to the alarm message generated by device 503. For instance, control system 530 could transmit routing table updates to devices 501, 502, and 504 indicating that device 503 is in a state of congestion. Each device would then update its own routing tables. The updated routing table scheme would move real-time application traffic away from paths utilizing device 503. For example, the second, third, and fifth paths discussed above could be avoided for real-time applications.

It should be understood that devices illustrated in FIGS. 3 and 5 could be end user devices, such as mobile phones, personal digital assistants, personal computers, or pagers, as well as other types of computing devices. In addition, the devices could be intermediate devices, such as media gateways, network border controllers, routers, or switching systems, as well as other types of intermediate devices. Advantageously, communication systems 300 and 500 provide an improved way to pro-actively manage network traffic utilizing static and adaptive jitter buffers in end user devices, as well as in intermediate devices. Additionally, communication systems 300 and 500 provide a pro-active mechanism for discovering latency issues in particular communication paths.

Figure 6:
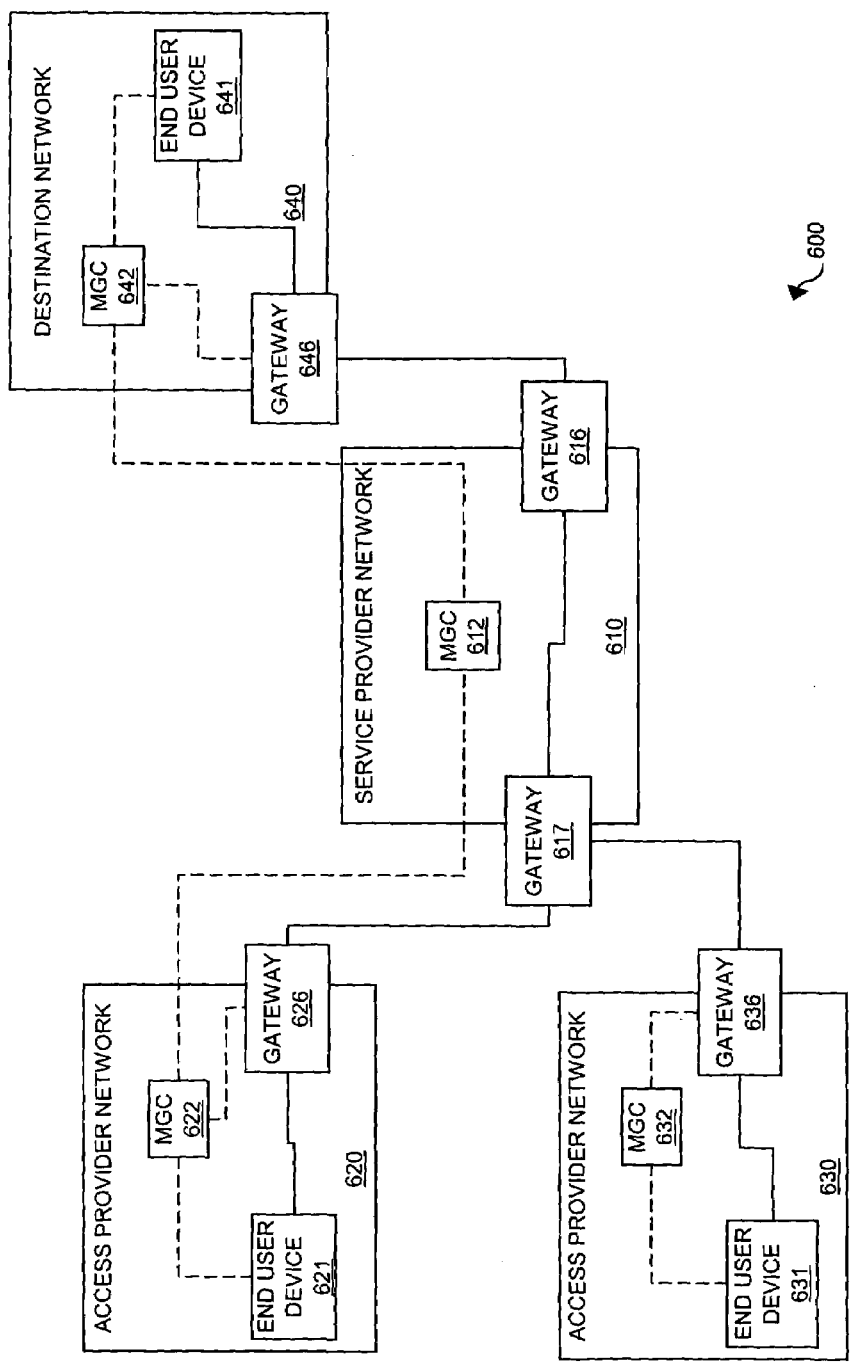
FIG. 6 illustrates a communication network in an embodiment of the invention.

FIG. 6 illustrates communication network 600 in an embodiment of the invention. Communication network 600 includes service provider network 610, access provider network 620, access provider network 630, and destination network 640. Service provider network 610 includes media gateway controller (MGC) 612, gateway 616, and gateway 617. Access provider network 620 includes MGC 622, end user device 621, and gateway 626. Access provider network 630 includes MGC 632, end user device 631, and gateway 636. Destination network 640 includes switching control system 642, and end user device 641.

In operation, service provider network 610 provides services, such as VoP calling, to end users in access provider networks 620 and 640. Access provider networks 620 and 630 could be, for example, cable networks. Similarly, end users 621 and 631 could subscriber to service provided by service provider network 610, while gaining access to the services from access provider networks 620 and 630 respectively.

Assuming a situation wherein device 621 is in communication with end user device 641 during a VoP call, end user device could become overloaded. Specifically, end user device 621 could include a jitter buffer, either adaptive or fixed. When the jitter buffer in end user device 621 becomes overloaded, device 621 could transfer an alarm message to MGC 622. MGC 622 holds a routing table that instructs that VoP calls from end user 621 be routed to service provider network 610. In response to receiving the alarm message, MGC 622 transfers the alarm message to MGC 612 in service provider network 610. MGC 612 receives the alarm message and is alerted to the fact that service to end users in access provider network 620 could be degraded. The same operation could apply to end user device 631 and MGC 632 in access provider network 630.

In certain cases, intermediate devices could transmit alarm message in response to their jitter buffers becoming overloaded or congested. For example, gateway 626 could transmit an alarm message to MGC 622 indicating that its jitter buffer is overloaded. MGC 622 would then transfer the alarm message to MGC 612, thereby informing MGC 612 that the path between gateways 626 and 617 could be degraded. Similarly, gateway 636 could transmit an alarm message to MGC 632, and gateway 636 could transmit an alarm message to MGC 642. Each MGC 632 and 642 would then transmit the alarm messages to MGC 612. MGC 612 can then receive and process the various alarm messages to provide a comprehensive view of the performance of services offered by service provider network 610.

Computer System

Figure 7:
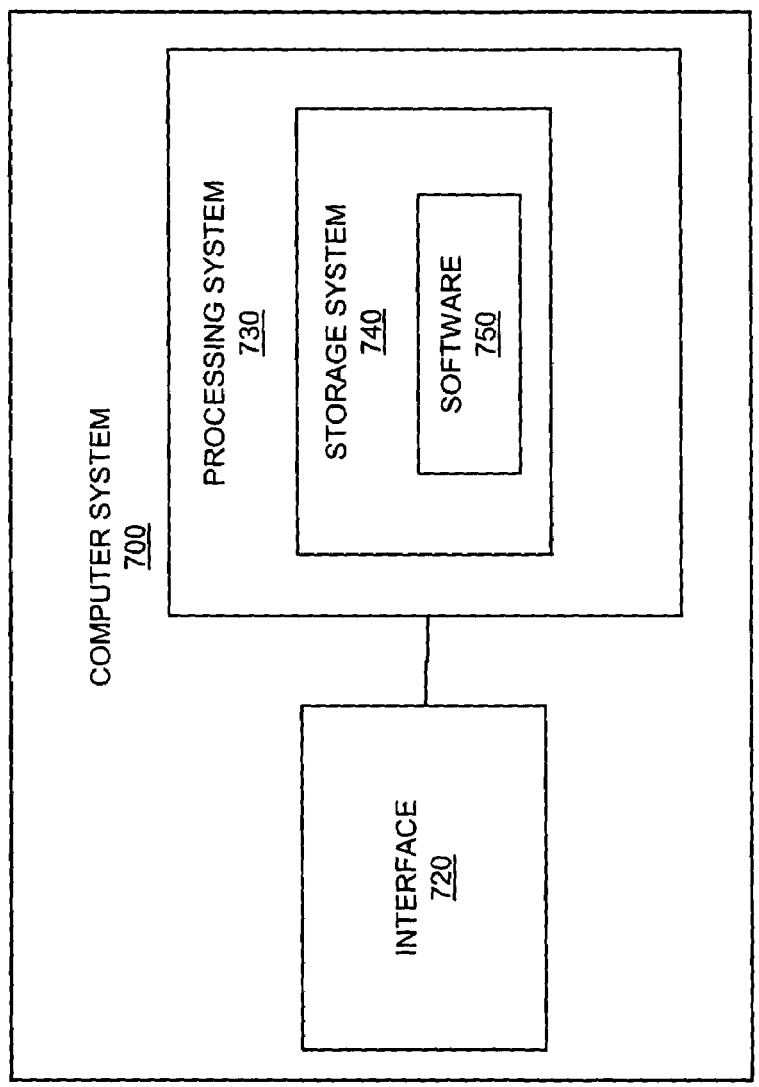
FIG. 7 illustrates a computer system in an embodiment of the invention.

FIG. 7 illustrates computer system 700 in an embodiment of the invention. Computer system 700 includes interface 720, processing system 730, storage system 740, and software 750. Storage system 740 stores software 750. Processing system 730 is linked to interface 720. Computer system 700 could be comprised of a programmed general-purpose computer, although those skilled in the art will appreciate that programmable or special purpose circuitry and equipment may be used. Computer system 700 may use a client server architecture where operations are distributed among a server system and client devices that together comprise elements 720-750.

Interface 720 could comprise a network interface card, modem, port, or some other communication device. Signaling interface 720 may be distributed among multiple communication devices. Interface 730 could comprise a computer microprocessor, logic circuit, or some other processing device. Processing system 730 may be distributed among multiple processing devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a general-purpose computer. Software 750 could also comprise an application program, firmware, or some other form of machine-readable processing instructions. When executed by the processing system 730, software 750 directs processing system 730 to operate as described for communication network 100, communication system 300, communication network 500, and communication network 600.

What is claimed is:

1. A method of operating a communication system with a first communication device having a first jitter buffer, the method comprising:
    exchanging communications between the first communication device and a second communication device having a second jitter buffer;
    buffering communications in the first jitter buffer;
    determining a utilization metric based on a percentage used of the first jitter buffer;
    processing the utilization metric to determine a usage state of the first jitter buffer; and
    transmitting a state message indicating the usage state of the first jitter buffer to adjust the size of the second jitter buffer to a call processing system that resides in a service provider network.

2. The method of claim 1 wherein the first communication device resides within an access provider network.

3. The method of claim 1 further comprising transmitting a control message from the call processing system to the second communication device in response to the percentage used of the first jitter buffer being high, wherein the control message instructs the second communication device to increase its jitter buffer size.

4. The method of claim 1 wherein the second jitter buffer comprises a bi-directional jitter buffer.

5. The method of claim 1 wherein the second jitter buffer comprises an adaptive jitter buffer.

6. The method of claim 1 further comprising transmitting a control message from the call processing system to the second communication device in response to the percentage used of the first jitter buffer being high, wherein the control message instructs the second communication device to slow its transmission rate.

7. A first communication device comprising:
    a first jitter buffer configured to buffer communications;
    a processing system configured to determine a utilization metric based on a percentage used of the first jitter buffer, and process the utilization metric to determine a usage state of the first jitter buffer; and
    an interface configured to transmit a state message indicating the usage state of the first jitter buffer; wherein the first communication device is configured to communicate the state message with a second communication device having a second jitter buffer to adjust the size of the second jitter buffer; wherein the interface is further configured to transmit the state message to a call processing system that resides in a service provider network.

8. The first communication device of claim 7 wherein the first jitter buffer resides within an access provider network.

9. The first communication device of claim 7 wherein the call processing system is configured to transmit a control message to the second communication device in response to the percentage used of the jitter buffer being high, wherein the control message instructs the second communication device to increase its jitter buffer size.

10. The first communication device of claim 7 wherein the second jitter buffer comprises a bi-directional jitter buffer.

11. The first communication device of claim 7 wherein the second jitter buffer comprises an adaptive jitter buffer.

12. The first communication device of claim 7 wherein the call processing system is configured to transmit the control message to the second communication device in response to the percentage used of the jitter buffer being high, wherein the control message instructs the second communication device to slow its transmission rate.

13. The first communication device of claim 7, wherein the processing system is configured to determine when the first jitter buffer is congested and the first communication device is configured to transmit a message to the call processing system to send a control message to instruct the second device to adjust the second jitter buffer when the processing system determines that the first jitter buffer is congested.

14. The first communication device according to claim 13, wherein the control message instructs the second device to increase the second jitter buffer.

15. The first communication device according to claim 13, wherein the control message instructs the second device to slow the rate at which it communicates with the first communication device.

\* \* \* \* \*

UNITED STATES PATENT AND TRADEMARK OFFICE
CERTIFICATE OF CORRECTION

PATENT NO.       : 7,599,399 B1  
APPLICATION NO.  : 11/115490  
DATED            : October 6, 2009  
INVENTOR(S)      : Michael K. Bugenhagen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 813 days.

Signed and Sealed this

Twenty-eighth Day of September, 2010

David J. Kappos  
*Director of the United States Patent and Trademark Office*